United States Patent
Shafiulla et al.

(10) Patent No.: US 12,079,646 B2
(45) Date of Patent: Sep. 3, 2024

(54) ENTERPRISE DYNAMIC FORMS WITH ENTERPRISE RESOURCE PROCESSING

(71) Applicant: SAP SE, Walldorf (DE)

(72) Inventors: Mohammed Saifulla Shafiulla, Brisbane (AU); Nitin Mahajan, Haryana (IN); Karthikeyan Kanagaraj, Tamilnadu (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/076,709

(22) Filed: Dec. 7, 2022

(65) Prior Publication Data

US 2024/0192969 A1  Jun. 13, 2024

(51) Int. Cl.
*G06F 40/174* (2020.01)
*G06F 9/451* (2018.01)

(52) U.S. Cl.
CPC ............ *G06F 9/451* (2018.02); *G06F 40/174* (2020.01)

(58) Field of Classification Search
CPC ...... G06F 9/451; G06F 40/174; G06F 40/186; G06F 40/166
See application file for complete search history.

(56) References Cited

U.S. PATENT DOCUMENTS

| | | | |
|---|---|---|---|
| 2003/0197733 A1* | 10/2003 | Beauchamp | G06Q 10/10 715/764 |
| 2011/0029344 A1* | 2/2011 | Weiler | G06Q 30/06 705/26.8 |
| 2012/0310699 A1* | 12/2012 | McKenna | G06Q 10/00 705/7.26 |
| 2014/0278573 A1* | 9/2014 | Cook | G06F 16/245 705/4 |
| 2016/0110677 A1* | 4/2016 | Aynsley-Hartwell | G06Q 10/20 705/7.15 |
| 2017/0109341 A1* | 4/2017 | Issa | G06F 16/21 |
| 2020/0097921 A1* | 3/2020 | Ghosh | G06N 3/08 |
| 2021/0344739 A1* | 11/2021 | Kalva | G06F 8/40 |
| 2023/0065845 A1* | 3/2023 | Patti | G06F 11/366 |

* cited by examiner

*Primary Examiner* — KC Chen
(74) *Attorney, Agent, or Firm* — SCHWEGMAN LUNDBERG & WOESSNER, P.A.

(57) ABSTRACT

In an example embodiment, a set of applications is provided that provides design-time, runtime, for form operations. A low-code or no-code form builder is provided as part of this set of applications. The low-code or no-code form builder is hosted on a business development platform (BTP), which is supported by multiple hyperscalers with rich control sets. Thus, the low-code or no-code form builder is able to provide an intuitive way of building forms using drag-and-drop functionality.

20 Claims, 6 Drawing Sheets

FIG. 2

‹ FORM RUNNER ▸    🔍 (KK)

PROACTIVE WORK – SUBMERSIBLE PUMP SERVICE - 3Y     STATUS: COMPLETE

| SAFETY | DE – ISOLATION AND TEST |
| WORK STEPS | AFTER OBTAINING PERMISSION FROM OPERATIONS, REMOVE LOCKS AND SWITCH ON |
| CHECK AND RECORD | ○ DONE  ○ NOT DONE  ○ NOT APPLICABLE |
| DE – ISOLATION TEST | ENSURE PUMP IS CORRECTLY CONNECTED TO THE STOOL MOUNT AND HAS SEALED |
| ASSET CONDITION & PLANN | ○ OK  ○ NOT OK  ○ NOT APPLICABLE |
| ‹  4 OF 5  › | ENSURE CORRECT FUNCTION BEFORE LEAVING SITE |
| | ○ OK  ○ NOT OK  ○ NOT APPLICABLE |

RECORD RUN HOURS *
[ 10 ] HRS
SHOW MEASUREMENT TREND

[ {=} SUMMARY ]  [ PREV ]  [ ‹ NEXT ]  [ 🖨 PDF ]  [ SAVE PROGRESS ]  [ SUBMIT ]

*FIG. 3*

ENTERPRISE DYNAMIC FORMS WITH
ENTERPRISE RESOURCE PROCESSING

BACKGROUND

Enterprise Resource Planning (ERP) software integrates into a single system various processes used to run an organization, such as finance, manufacturing, human resources, supply chain, services, procurement, and others. These processes typically provide intelligence, visibility, and efficiency across most if not all aspects of an organization. One example of ERP software is SAP® S/4 HANA from SAP SE of Walldorf, Germany. These ERP systems can sometime use forms to allow for the dynamic capturing of data, with the forms essentially able to change depending upon the context in which they are used.

BRIEF DESCRIPTION OF DRAWINGS

The present disclosure is illustrated by way of example and not limitation in the figures of the accompanying drawings, in which like references indicate similar elements.

FIG. 2 is an example of a user interface screen of the form builder, in accordance with an example embodiment.

FIG. 3 is a screen capture of an example screen of the form runner, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

There are technical problems with utilizing dynamic forms in ERP systems. Specifically, while dynamic behavior in the forms can be developed generally, this behavior is difficult to integrate with processes specific to the ERP systems, which makes these systems unusable. Additionally, the dynamic behavior in forms is rigid in nature, and comes with high complexity and development cost. Furthermore, dynamic forms are not easy for laypeople to understand. One generally needs a significant software background to understand how to build the dynamic forms.

In an example embodiment, a set of applications is provided that provides design-time, or runtime, for form operations. A low-code or no-code form builder is provided as part of this set of applications. The low-code or no-code form builder is hosted on a business development platform (BTP), which is supported by multiple hyperscalers with rich control sets. Thus, the low-code or no-code form builder is able to provide an intuitive way of building forms using drag-and-drop functionality.

Additionally, the forms can be built with dynamic abilities based on conditions, calculations, or process rules. The captured forms of data can be then post-processed to derive outcomes and create follow-on documents in the ERP.

An example embodiment will be described herein involving the area of asset management, and specifically the area of asset inspection. For example, some organizations may perform various processes related to asset management, and specifically asset inspection processes. Take, for example, a power company, which may perform periodic inspections of one or more assets, such as power poles. Such processes are handled by asset inspection processes, but the existing forms available for such asset inspections are rudimentary and static. The present disclosure describes mechanisms to make them more complex and dynamic. Despite asset management, and specifically asset inspection, being used as an example in this disclosure, the same techniques can be applied to other types of organization processes, and nothing in this disclosure shall be interpreted as limiting the scope of protection to asset inspection, or even asset management, unless explicitly recited.

Figure 1:
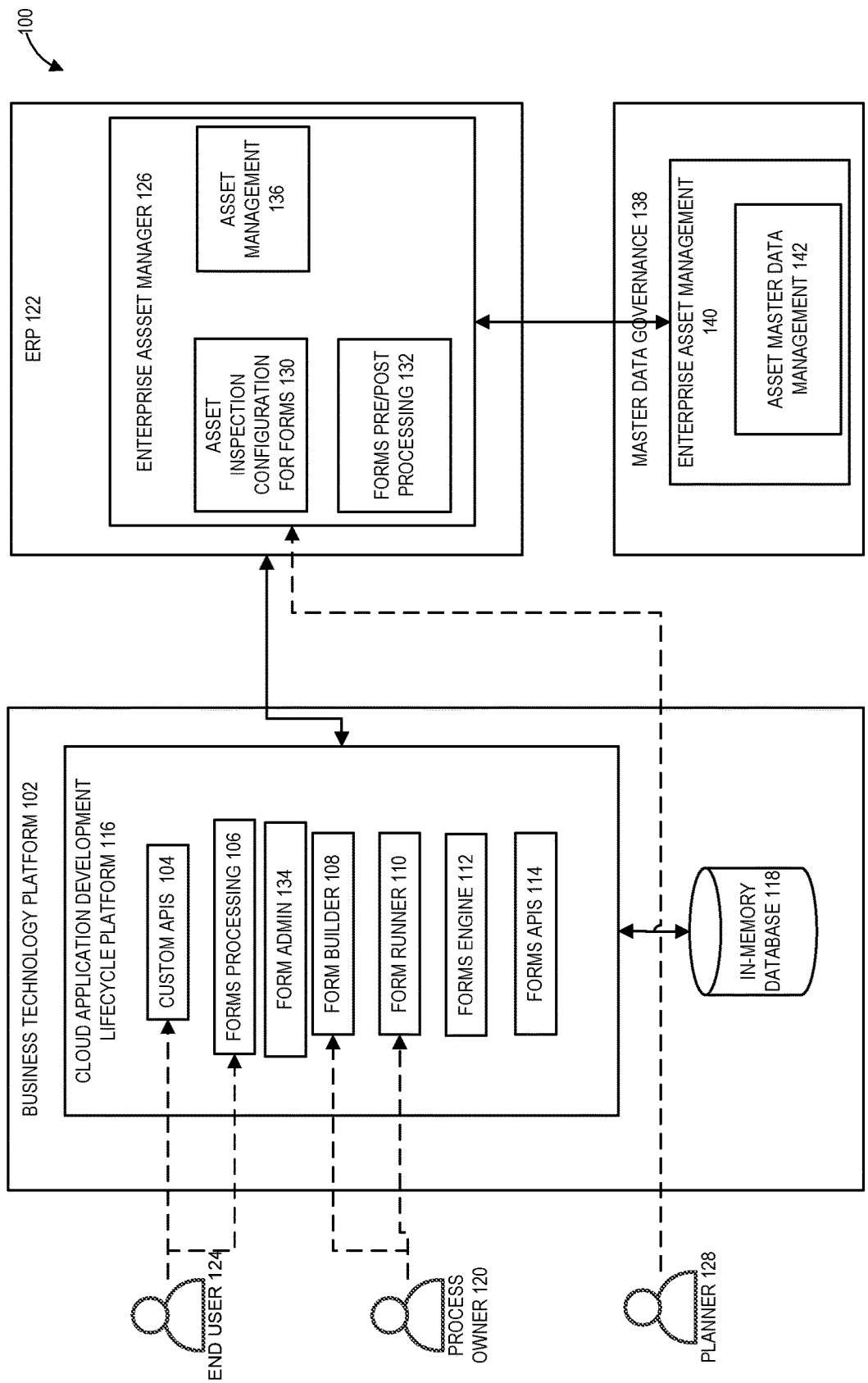
FIG. 1 is a block diagram illustrating a system, in accordance with an example embodiment.

FIG. 1 is a block diagram illustrating a system 100, in accordance with an example embodiment. More particularly, a BTP 102 provides various forms solutions 104-114 via a cloud application development lifecycle platform 116. An example of a cloud application development lifecycle platform 116 is Cloud Foundry™. Cloud Foundry™ is an open source, multi-cloud application platform as a service that allows for continuous delivery as it supports a full application development lifecycle, from initial deployment through testing stages to deployment. Cloud Foundry™ utilizes a container-based architecture that runs application in any programming language over a variety of cloud service providers.

In such a container-based infrastructure, the database instances utilized by the microservices may each contain a plurality of containers. More particularly, one example of a database 118 used with cloud-based microservices is an in-memory database. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany. Thus, in embodiments where the HANA® database is used with the microservices, each HANA® instance may contain a plurality of different containers, called HANA® Deployment Infrastructure (HDI) containers. More particularly, each HDI container comprises a design-time container and a corresponding runtime container. The design-time container is an isolated environment for design-time files, while the runtime container stores the deployed objects built according to the specification stored in the corresponding design-time artifacts. The design-time container does not provide direct access to the database storage, but instead contains metadata that can only be accessed via an HDI API.

The form builder 108 provides the ability to create and design form templates suitable for various work streams. There are various controls that can be used to enrich the form with validations and/or formulas, and create dependencies. The form builder 108 also has the ability to manage the lifecycle of the form with versioning. Library sections can also be created and reused in various forms. More particularly, a process owner 120 runs the form builder 108, which interfaces with forms engine 112 to identify one or more templates (as stored in the in-memory database 118) that can be used as the basis for the creation of a form by the process owner 120, via the user interface of the form builder 108.

The identification of a template to use as the basis for the creation of a form by the process owner 120 may be performed in a number of ways. In an example embodiment, the forms engine 112 maintains a set of one or more template rules that aid in suggesting one or more templates to the process owner 120 to select from. For example, the rules may, when executed by the forms engine 112, identify an organization of the process owner 120 and potentially other attributes of the process owner 120 (e.g., division of the organization in which the process owner works, process owner locations, etc.). The rules may then indicate which template or templates to suggest to the process owner 120 based on this information.

In another example embodiment, a first machine learning model (not pictured) can be used by the forms engine 112 to rank and recommend templates to the process owner 120.

In an example embodiment, the first machine learning model is trained by a first machine learning algorithm during a process wherein the first machine learning algorithm iterates among various weights (which are the parameters) that will be multiplied by input variables and evaluate a loss function at each iteration, until the loss function is minimized, at which stage the weights/parameters for that stage are learned. The training data may include manually labeled data, and in particular data regarding historical process owners (e.g., organization, division, location), with template selections by those historical process owners as labels. For example, if a process owner previously used template E, then an identification of template E would be used as a label for training data from that process owner and input to the first machine learning algorithm, which will train the first machine learning model to learn that template E should be recommended for process owners similar to that process owner.

In some example embodiments, the training of the first machine learning model may take place as a dedicated training phase where, such labeled training data is fed to the first machine learning algorithm. In other example embodiments, the first machine learning model is retrained dynamically at runtime by the process owner inputting a template different than the one recommended or selected for a particular work order, thus essentially creating a new set of training data where the information involving the deselected template is treated as a negative sample and the information involving the selected template is treated as a positive sample.

The first machine learning algorithm may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

Once the form templates are created and published in the form builder 108, they are available to create instances to perform actual inspections. Since inspections are typically carried out by means of a work order, the forms may be associated with work orders.

Once the form is designed with all the fields needed, it can be mapped to standard or custom fields in the ERP 122. This may be performed using a mapping application/transaction. This downloads the form metadata from BTP 102 and allows mapping the form's fields to characteristics/measurement points (in the context of Enterprise Asset Management (EAM)) or to a flexible payload coming from another system as well.

Figure 2:
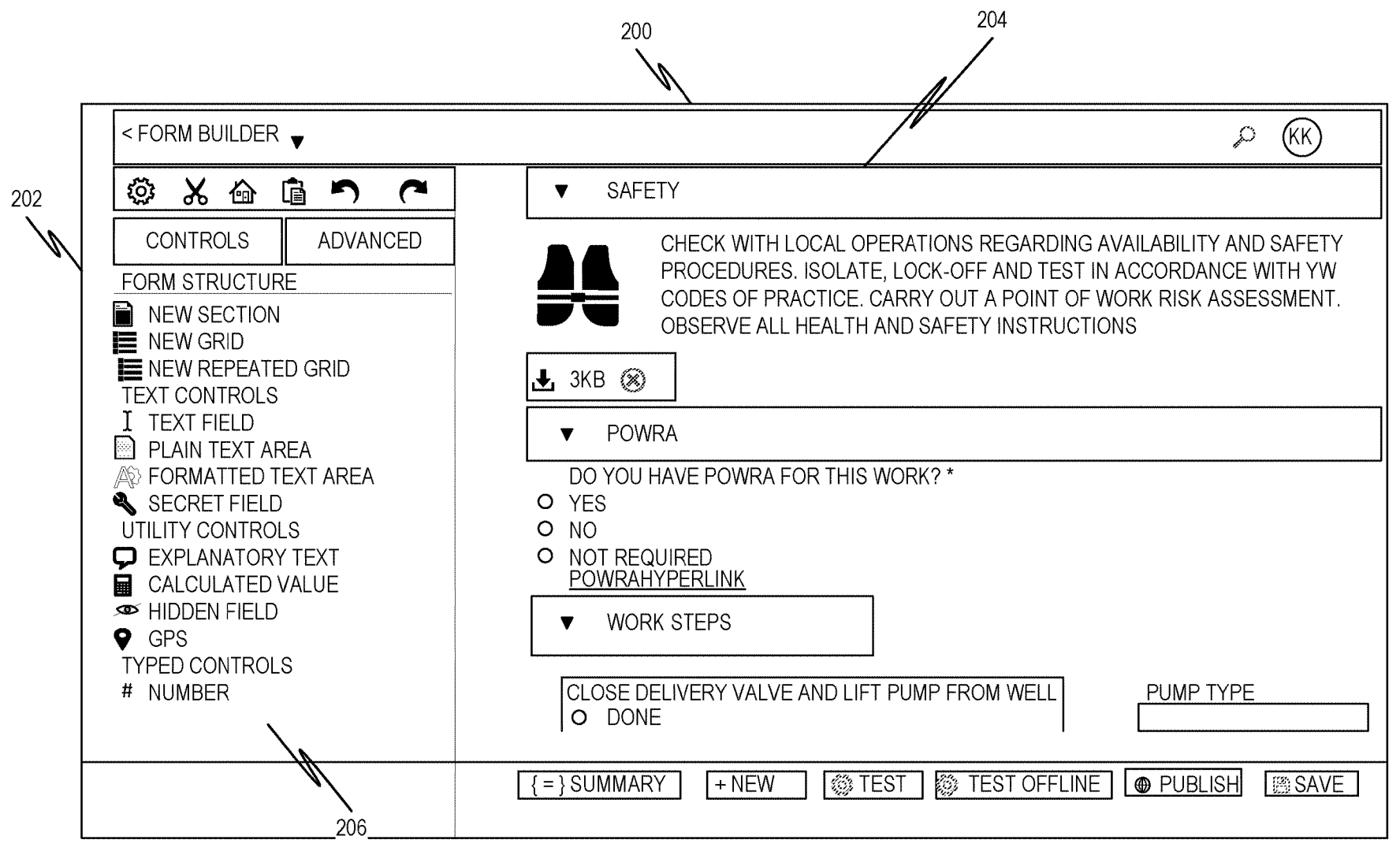

FIG. 2 is an example of user interface screen 200 of the form builder, in accordance with an example embodiment. A control area 202 contains a set of different types of controls, including controls over form structure, text controls, utility controls, and typed controls, that allow the process owner 120 to create and/or edit the form. The form may be initially created using a template, and the process owner 120 edits the specific form instance of that template using the controls in the control area 202. A form display area 204 displays the screen that the form will generate in various sections. For example, here a safety section of a form is displayed on form display area 204. The end user 124 of FIG. 1 will see this safety section when running the form, and the form display area 204 essentially allows the process owner 120 to preview that screen.

The process owner 120 of FIG. 1 is also able to use the control area 202 to create sections, subsections, and dependencies in the form. Lifecycle control area 206 contains controls allowing the process owner 120 to preview and manage lifecycle and versioning of the forms.

Referring back to FIG. 1, the form runner 110 manages the instances of the forms created out of templates designed using the form builder 108. While the form runner 110 can be used as a stand-alone application, it can also be used in the context of ERP processes or objects to solve business problems. More particularly, forms processing 106 can be launched automatically when a work order is created. The work order may retrieve the appropriate form for each of one or more jobs referenced by the work order, based on rules that may have been created by planner 128. It should be noted that "jobs" in this context refers to a unit of execution within a software process, and not a type of employment. Thus, for clarity, the remainder of this document shall refer to jobs as "units of execution." These rules may be created in a business rules framework (BRF). These rules identify the form that needs to be linked to the work order. These rules may take various inputs, such as the work order type, operation standard text key, function location object type, equipment object type, and maintenance activity type. More particularly, ERP 122 contains Enterprise Asset Manager 126, which itself can contain asset inspection configuration for forms 130. The BRF rules may be stored in asset inspection configuration for forms 130.

BRF rules can be run in the background on dispatching of operations in a work order. The appropriate form based on the rule definition is associated. This streamlines the process with ones driven by dynamic forms. During execution of a work order, a user can easily launch the form in the context of the object and perform the activities.

In another example embodiment, a second machine learning model (not pictured) can be used by the forms engine 112 to recommend or select a form for a particular work order.

In an example embodiment, the second machine learning model is trained by a second machine learning algorithm during a process wherein the second machine learning algorithm iterates among various weights (which are the parameters) that will be multiplied by various input variables and evaluate a loss function at each iteration, until the loss function is minimized, at which stage the weights/parameters for that stage are learned. The training data may include manually labeled data, and in particular data regarding previous work orders and their operating contexts, such as information about work order type, operation standard text key, function location object type, equipment object type, and maintenance activity type. The training data may be labeled based on forms that were ultimately used for those historical work orders in those contexts. For example, if an end user previously ran form Y to help complete work order A under a particular set of operating variables, then form Y would be used as a label for the combination of work order A and the particular set of operating variables and input to the second machine learning algorithm, which will train the second machine learning model to learn that form A should be selected work orders similar to work order A under circumstances similar to the particular set of operating variables.

In some example embodiments, the training of the second machine learning model may take place as a dedicated training phase where, such labeled training data is fed to the second machine learning algorithm. In other example embodiments, the second machine learning model is retrained dynamically at runtime by the end user inputting a form different than the one recommended or selected for a particular work order, thus essentially creating a new set of training data where the information involving the deselected form is treated as a negative sample and the information involving the selected form is treated as a positive sample.

The second machine learning algorithm may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The form runner 110 can also automatically prepopulate certain fields or input areas of the form from data in the ERP 122. More particularly, planner 128 can map various fields and or other input areas of forms to particular fields of data stored by the ERP 122. This mapping may be stored in asset inspection configuration for forms 130.

The form runner 110 is then able to automatically prepopulate one or more fields of the form with data from the ERP 122, using the mappings stored in the asset inspection configuration for forms 130.

The end user 124 then can complete the various processes of the form to input additional data to the form, for any fields necessitated by the process embodied in the form. The planner 128 can also create one or more measuring points and store mappings between the measuring points and form fields in the asset inspection configuration for forms 130. These measuring points are areas in the ERP that need to be automatically filled in with data that the end user 124 has input into the form. At runtime, when the user fills in data in those fields, a forms pre/post processing 132 component then automatically pushes that data to the appropriate measuring points in the ERP 122, based on the mappings, even prior to the end user 124 officially indicating that the process form has been completed (such as by selecting a "submit" button in the user interface).

The form runner 110 can also list all form instances, and provide an interface for the end user 124 to search the form instances. FIG. 3 is a screen capture of an example screen 300 of the form runner, in accordance with an example embodiment. The end user 124 of FIG. 1 can select from several forms 302A-302E, using this screen. Here, the user has selected a form for De-Isolation and Test 302D. Doing so displays the form in area 304. The user can complete the input fields of this form and, once complete, submit the form for processing. Validations of the form can happen in real time.

Form admin 134 of FIG. 1 is used to host various administrative functions, such as moving forms across landscapes, to allow for seamless integration between environments. Form admin 134 allows the process owner 120 of FIG. 1 to set availability of forms, push/pull published forms from other configured landscapes, delete published forms, and reindex a database for form data.

Forms APIs 114 of FIG. 1 are used for communications to and from the various form application components, such as custom APIs 104 of FIG. 1, forms processing 106, forms builder 108, form runner 110, and forms engine 112, all shown in FIG. 1. Custom APIs 104 can be provided to perform various custom communications.

The enterprise asset manager 126 also contains a standard asset management 136 component, which can be used to actually manage the underlying assets of the organization.

The ERP 122 of FIG. 1 itself can also communicate with a master data governance 138 component of FIG. 1, which contains an enterprise asset management 140 component of FIG. 1, which itself contains an asset master data management 142 component of FIG. 1.

Data input from the form can also be used to automatically perform one or more follow-up actions based on the input data. The decision of which follow up actions are to be performed may be determined by, for example, a third machine learning model trained by a third machine learning algorithm.

In an example embodiment, the third machine learning model is trained by a third machine learning algorithm during a process wherein the third machine learning algorithm iterates among various weights (which are the parameters) that will be multiplied by various input variables and evaluate a loss function at each iteration, until the loss function is minimized, at which stage the weights/parameters for that stage are learned. The training data may include manually labeled data, and in particular data showing historical follow-up actions and associated input data. The labels will be the indications of which follow-up actions were performed in response to which input data.

In some example embodiments, the training of the third machine learning model may take place as a dedicated training phase where, such labeled training data is fed to the third machine learning algorithm. In other example embodiments, the third machine learning model is retrained dynamically at runtime by the end user performing a different follow-up action than one that was automatically performed The third machine learning algorithm may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

Figure 4:
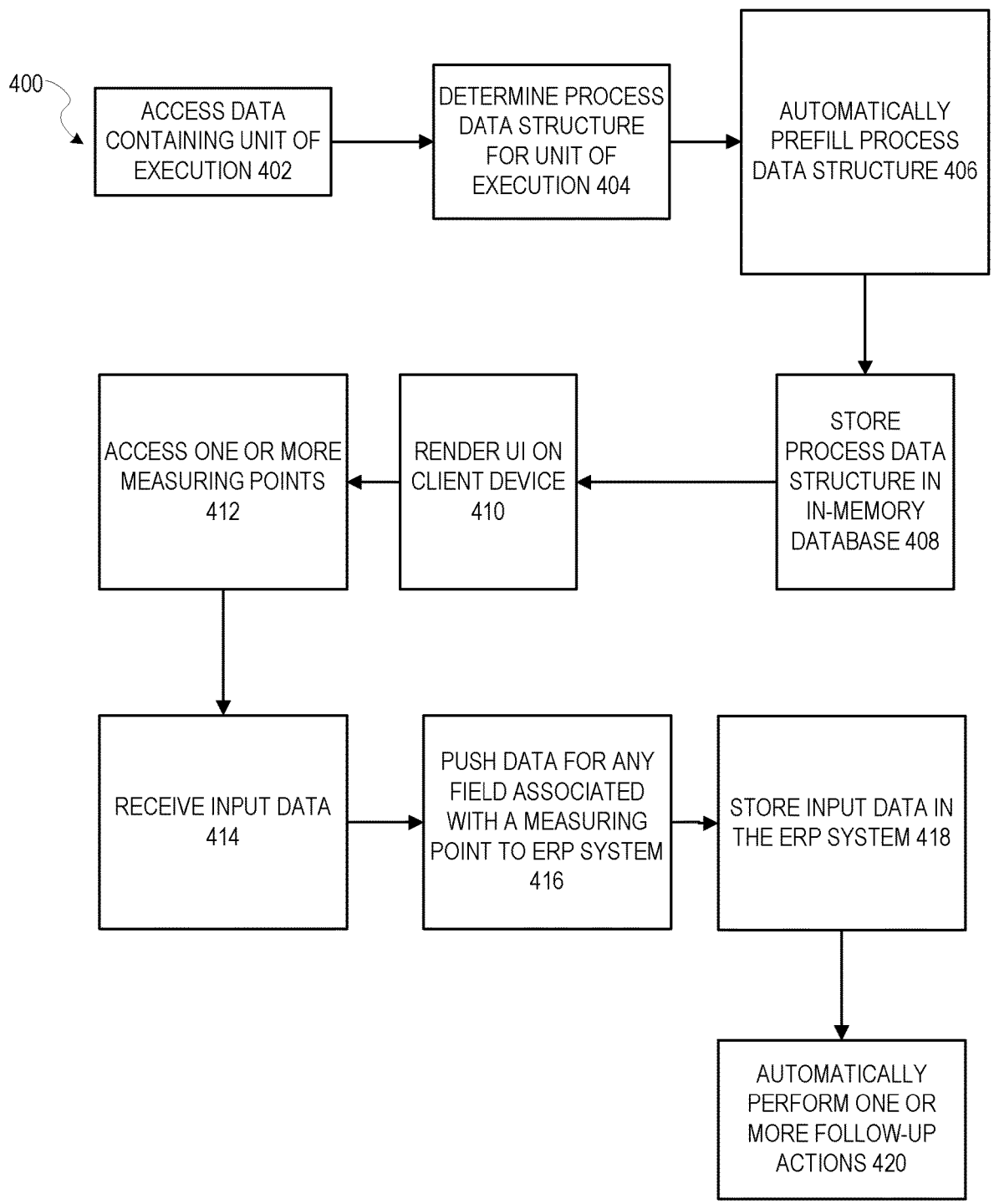
FIG. 4 is a flow diagram illustrating a method of providing dynamic data structures for an ERP system, in accordance with an example embodiment.

FIG. 4 is a flow diagram illustrating a method 400 of providing dynamic data structure for an ERP system, in accordance with an example embodiment. Each dynamic data structure may be a form. At operation 402, data is accessed. The data may be a work order. The work order contains work order information and references a unit of execution. At operation 404, a process data structure for the unit of execution is automatically determined based on the unit of execution and the information. The process data structure describes a process, the process including a sequence of steps, with at least some of the steps including collecting of data. The automatic determining may be performed in a number of different ways. In one example embodiment, one or more BRF rules are run to make this determination. The BRF rules define actions taken during execution of the BRF rules to determine the process form from a plurality of potential process data structures based on one or more of work order type, operation standard text key, function location object type, equipment object type, and maintenance activity type. In another example embodiment, a machine learning model trained by a machine learning algorithm is used. The training uses training data having one or more of work order type, operation standard text key, function location object type, equipment object type, and maintenance activity type.

At operation 406, data is automatically prefilled in the process data structure from data in an ERP system, based on a mapping between fields of the steps and data in the ERP system. At operation 408, the process data structure with the prefilled data is stored in an in-memory database. At operation 410, a user interface is rendered on a client device. The user interface is rendered based on the process form, and the rendering involves providing the steps of the process form in the display along with fields, some of the fields including prefilled data.

At operation 412, one or more measuring points defined in the ERP system are accessed. Each measuring point is associated with a field of the process form. At operation 414, input data is received from the user interface for fields that have not been prefilled. At operation 416, data is automatically pushed to the ERP system for data entered into any field associated with a measuring point. At operation 418, the input data is stored in the ERP system upon the end user indicating that the process form is to be submitted.

At operation 420, one or more follow-up actions are automatically performed based on the input data. The decision of which follow up actions are to be performed may be determined by a machine learning model trained by a machine learning algorithm, using training data having one or more follow-up actions and associated input data, along with labels indicating which of the one or more follow-up actions were performed in response to which input data.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
   at least one hardware processor; and
   a computer-readable medium storing instructions that, when executed by the at least one hardware processor, cause the at least one hardware processor to perform operations comprising: accessing data, the data containing information and referencing a unit of execution;
   automatically determining a process data structure for the unit of execution data based on the unit of execution and the information, the process data structure describing a process, the process including a sequence of steps, with at least some of the steps including collecting of data;
   automatically prefilling data in the process data structure from data in an Enterprise Resource Planning (ERP) system, based on a mapping between fields of the steps and data in the ERP system;
   causing a rendering of a user interface based on the process data structure, the rendering including the prefilled data;
   receiving input data from the user interface; and
   storing the input data in the ERP system.

Example 2. The system of Example 1, wherein the operations further comprise:
   accessing one or more measuring points defined in the ERP system, each measuring point associated with a field of the process data structure; and
   automatically pushing data to the ERP system for data entered into any field associated with a measuring point.

Example 3. The system of Example 1 or 2, wherein the automatically determining a process data structure includes running one or more business rules framework (BRF) rules, the one or more BRF rules defining actions taken during execution to determine the process data structure from a plurality of potential process data structures based on one or more of data type, operation standard text key, function location object type, equipment object type, and maintenance activity type.

Example 4. The system of any of Examples 1-3, wherein the automatically determining is performed by a machine learning model trained by a machine learning algorithm, using training data having one or more of data type, operation standard text key, function location object type, equipment object type, and maintenance activity type.

Example 5. The system of any of Examples 1-4, wherein the process data structure with the prefilled data is stored in an in-memory database.

Example 6. The system of any of Examples 1-5, wherein the operations further comprise automatically performing one or more follow-up actions based on the input data.

Example 7. The system of Example 6, wherein the one or more follow-up actions are determined by a machine learning model trained by a machine learning algorithm, using training data having one or more follow-up actions and associated input data, along with labels indicating which of the one or more follow-up actions were performed in response to which input data.

Example 8. A method comprising:
   accessing a work order data, the work order data containing work order information and referencing a unit of execution;
   automatically determining a process form data structure for the unit of execution data based on the unit of execution and the work order information, the process form data structure describing a process, the process including a sequence of steps, with at least some of the steps including collecting of data;
   automatically prefilling data in the process form data structure from data in an Enterprise Resource Planning (ERP) system, based on a mapping between fields of the steps and data in the ERP system;
   causing a rendering of a user interface based on the process form data structure, the rendering including the prefilled data;
   receiving input data from the user interface; and
   storing the input data in the ERP system.

Example 9. The method of Example 8, further comprising:
accessing one or more measuring points defined in the ERP system, each measuring point associated with a field of the process data structure; and
automatically pushing data to the ERP system for data entered into any field associated with a measuring point.

Example 10. The method of Example 8 or 9, wherein the automatically determining a process data structure includes running one or more business rules framework (BRF) rules, the one or more BRF rules defining actions taken during execution to determine the process data structure from a plurality of potential process data structures based on one or more of data type, operation standard text key, function location object type, equipment object type, and maintenance activity type.

Example 11. The method of any of Examples 8-10, wherein the automatically determining is performed by a machine learning model trained by a machine learning algorithm, using training data having one or more of data type, operation standard text key, function location object type, equipment object type, and maintenance activity type.

Example 12. The method of any of Examples 8-11, wherein the process data structure with the prefilled data is stored in an in-memory database.

Example 13. The method of any of Examples 8-12, further comprising automatically performing one or more follow-up actions based on the input data.

Example 14. The method of Example 13, wherein the one or more follow-up actions are determined by a machine learning model trained by a machine learning algorithm, using training data having one or more follow-up actions and associated input data, along with labels indicating which of the one or more follow-up actions were performed in response to which input data.

Example 15. A non-transitory machine-readable medium storing instructions which, when executed by one or more processors, cause the one or more processors to perform operations comprising:
accessing data, the data containing information and referencing a unit of execution;
automatically determining a process data structure for the unit of execution data based on the unit of execution and the information, the process data structure describing a process, the process including a sequence of steps, with at least some of the steps including collecting of data;
automatically prefilling data in the process data structure from data in an Enterprise Resource Planning (ERP) system, based on a mapping between fields of the steps and data in the ERP system;
causing a rendering of a user interface based on the process data structure, the rendering including the prefilled data;
receiving input data from the user interface; and
storing the input data in the ERP system.

Example 16. The non-transitory machine-readable medium of Example 15, wherein the operations further comprise:
accessing one or more measuring points defined in the ERP system, each measuring point associated with a field of the process data structure; and
automatically pushing data to the ERP system for data entered into any field associated with a measuring point.

Example 17. The non-transitory machine-readable medium of Examples 15 or 16, wherein the automatically determining a process data structure includes running one or more business rules framework (BRF) rules, the one or more BRF rules defining actions taken during execution to determine the process data structure from a plurality of potential process data structures based on one or more of data type, operation standard text key, function location object type, equipment object type, and maintenance activity type.

Example 18. The non-transitory machine-readable medium of Examples 15-17, wherein the automatically determining is performed by a machine learning model trained by a machine learning algorithm, using training data having one or more of data type, operation standard text key, function location object type, equipment object type, and maintenance activity type.

Example 19. The non-transitory machine-readable medium of any of Examples 15-18, wherein the process data structure with the prefilled data is stored in an in-memory database.

Example 20. The non-transitory machine-readable medium of any of Examples 15-19, wherein the operations further comprise automatically performing one or more follow-up actions based on the input data.

Figure 5:
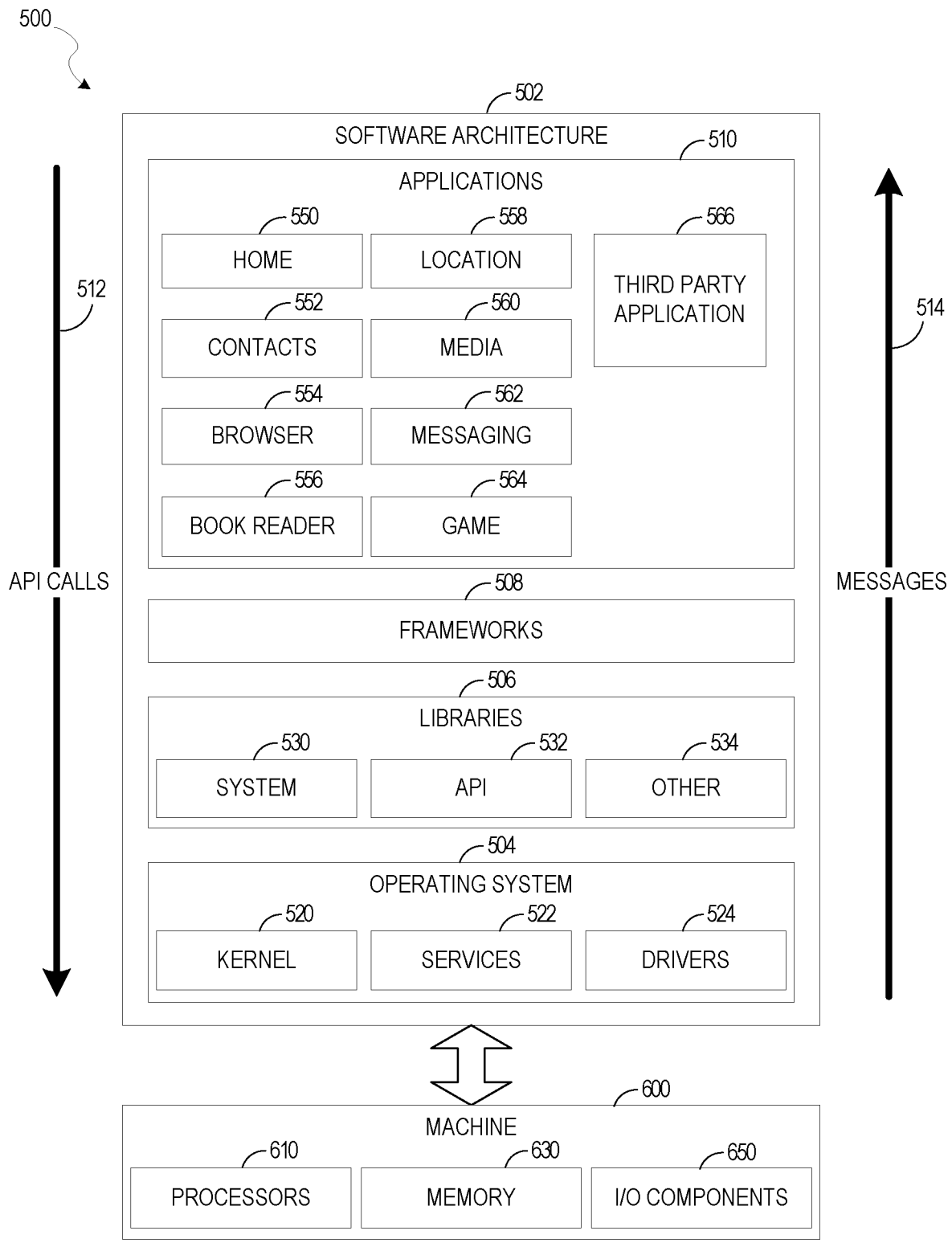
FIG. 5 is a block diagram illustrating a software architecture in accordance with an example embodiment.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke Application Program Interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. The applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 566 can invoke the API calls 512 provided by the operating system 504 to facilitate functionality described herein.

Figure 6:
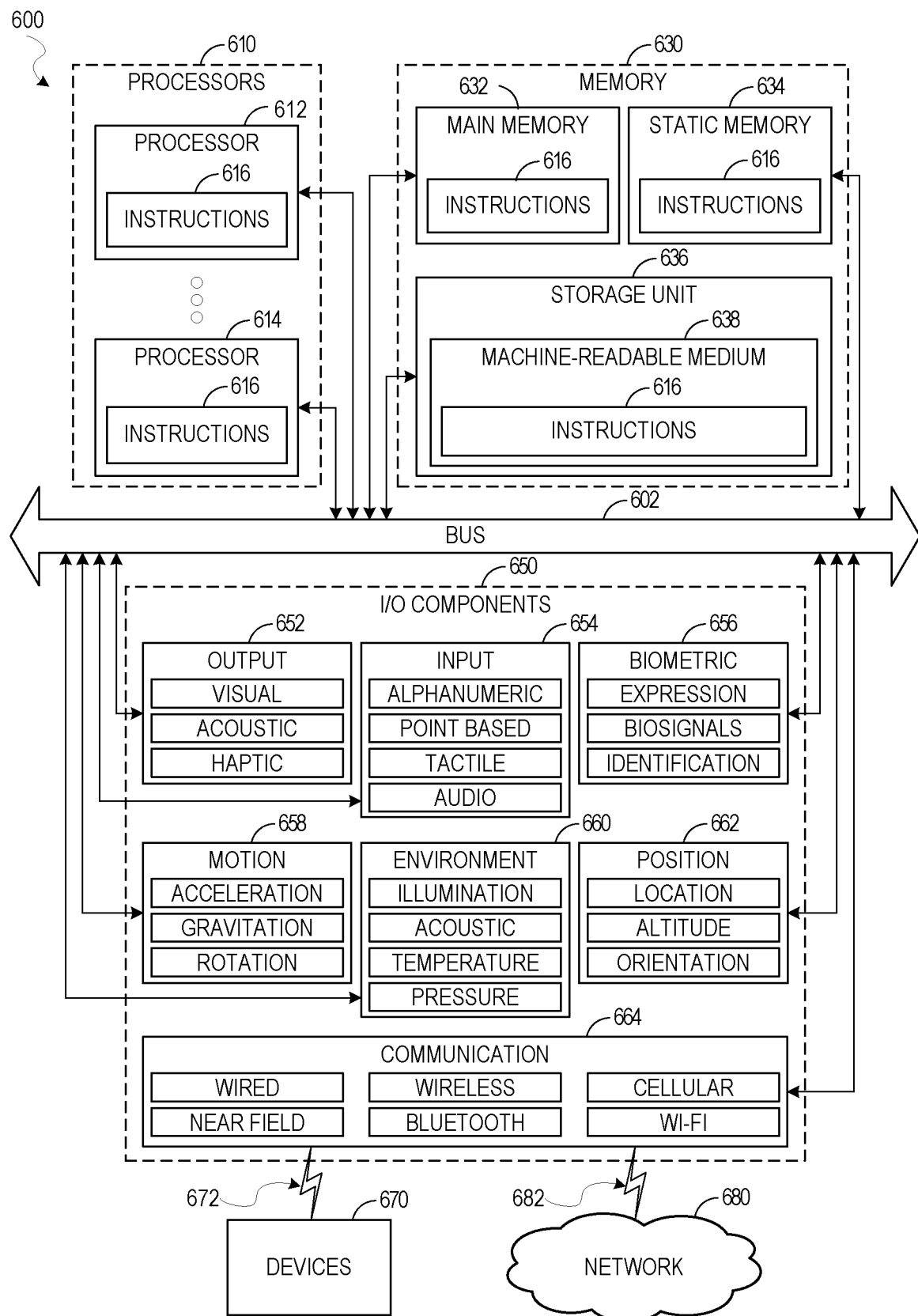
FIG. 6 illustrates a diagrammatic representation of a machine in the form of a computer system within which a set of instructions may be executed for causing the machine to perform any one or more of the methodologies discussed herein.

FIG. 6 illustrates a diagrammatic representation of a machine 600 in the form of a computer system within which a set of instructions may be executed for causing the machine 600 to perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO)

technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communication signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a computer-readable medium storing instructions that, when executed by the at least one hardware processor, cause the at least one hardware processor to perform operations comprising:
        accessing data, the data containing information and referencing a unit of execution;
        automatically determining a process data structure for the unit of execution data based on the unit of execution and the information, the process data structure describing a process, the process including a sequence of steps, with at least some of the steps including collecting of data for unfilled fields of the steps;
        automatically prefilling data in the unfilled fields of the process data structure from data in an Enterprise Resource Planning (ERP) system, based on a previously stored mapping between the unfilled fields of the steps and data in the ERP system, the previously stored mapping stored in a repository that contains asset inspection configurations for forms, the forms comprising a form embodying the sequence of steps from the process data structure;
        causing a rendering of a user interface with the form, the form based on the process data structure, the rendering including the prefilled data;
        receiving input data from the user interface; and
        storing the input data in the ERP system.

2. The system of claim 1, wherein the operations further comprise:
    accessing one or more measuring points defined in the ERP system, each measuring point associated with a field of the process data structure; and
    automatically pushing data to the ERP system for data entered into any field associated with a measuring point.

3. The system of claim 1, wherein the automatically determining a process data structure includes running one or more business rules framework (BRF) rules, the one or more BRF rules defining actions taken during execution to determine the process data structure from a plurality of potential process data structures based on one or more of data type, operation standard text key, function location object type, equipment object type, and maintenance activity type.

4. The system of claim 1, wherein the automatically determining is performed by a machine learning model trained by a machine learning algorithm, using training data having one or more of data type, operation standard text key, function location object type, equipment object type, and maintenance activity type.

5. The system of claim 1, wherein the process data structure with the prefilled data is stored in an in-memory database.

6. The system of claim 1, wherein the operations further comprise automatically performing one or more follow-up actions based on the input data.

7. The system of claim 6, wherein the one or more follow-up actions are determined by a machine learning model trained by a machine learning algorithm, using training data having one or more follow-up actions and associated input data, along with labels indicating which of the one or more follow-up actions were performed in response to which input data.

8. A method comprising:
    accessing data, the data containing information and referencing a unit of execution;
    automatically determining a process data structure for the unit of execution data based on the unit of execution and the information, the process data structure describing a process, the process including a sequence of steps, with at least some of the steps including collecting of data for unfilled fields of the steps;
    automatically prefilling data in the unfilled fields of the process data structure from data in an Enterprise Resource Planning (ERP) system, based on a previously stored mapping between the unfilled fields of the steps and data in the ERP system, the previously stored mapping stored in a repository that contains asset inspection configurations for forms, the forms comprising a form embodying the sequence of steps from the process data structure;
    causing a rendering of a user interface with the form, the form based on the process data structure, the rendering including the prefilled data;
    receiving input data from the user interface; and
    storing the input data in the ERP system.

9. The method of claim 8, further comprising:
    accessing one or more measuring points defined in the ERP system, each measuring point associated with a field of the process data structure; and
    automatically pushing data to the ERP system for data entered into any field associated with a measuring point.

10. The method of claim 8, wherein the automatically determining a process data structure includes running one or more business rules framework (BRF) rules, the one or more BRF rules defining actions taken during execution to determine the process data structure from a plurality of potential process data structures based on one or more of data type, operation standard text key, function location object type, equipment object type, and maintenance activity type.

11. The method of claim 8, wherein the automatically determining is performed by a machine learning model trained by a machine learning algorithm, using training data having one or more of data type, operation standard text key, function location object type, equipment object type, and maintenance activity type.

12. The method of claim 8, wherein the process data structure with the prefilled data is stored in an in-memory database.

13. The method of claim 8, further comprising automatically performing one or more follow-up actions based on the input data.

14. The method of claim 13, wherein the one or more follow-up actions are determined by a machine learning model trained by a machine learning algorithm, using training data having one or more follow-up actions and associated input data, along with labels indicating which of the one or more follow-up actions were performed in response to which input data.

15. A non-transitory machine-readable medium storing instructions which, when executed by one or more processors, cause the one or more processors to perform operations comprising:
   accessing data, the data containing information and referencing a unit of execution;
   automatically determining a process data structure for the unit of execution data based on the unit of execution and the information, the process data structure describing a process, the process including a sequence of steps, with at least some of the steps including collecting of data for unfilled fields of the steps;
   automatically prefilling data in the unfilled fields of the process data structure from data in an Enterprise Resource Planning (ERP) system, based on a previously stored mapping between the unfilled fields of the steps and data in the ERP system, the previously stored mapping stored in a repository that contains asset inspection configurations for forms, the forms comprising a form embodying the sequence of steps from the process data structure;
   causing a rendering of a user interface with the form, the form based on the process data structure, the rendering including the prefilled data;
   receiving input data from the user interface; and
   storing the input data in the ERP system.

16. The non-transitory machine-readable medium of claim 15, wherein the operations further comprise:
   accessing one or more measuring points defined in the ERP system, each measuring point associated with a field of the process data structure; and
   automatically pushing data to the ERP system for data entered into any field associated with a measuring point.

17. The non-transitory machine-readable medium of claim 15, wherein the automatically determining a process data structure includes running one or more business rules framework (BRF) rules, the one or more BRF rules defining actions taken during execution to determine the process data structure from a plurality of potential process data structures based on one or more of data type, operation standard text key, function location object type, equipment object type, and maintenance activity type.

18. The non-transitory machine-readable medium of claim 15, wherein the automatically determining is performed by a machine learning model trained by a machine learning algorithm, using training data having one or more of data type, operation standard text key, function location object type, equipment object type, and maintenance activity type.

19. The non-transitory machine-readable medium of claim 15, wherein the process data structure with the prefilled data is stored in an in-memory database.

20. The non-transitory machine-readable medium of claim 15, wherein the operations further comprise automatically performing one or more follow up actions based on the input data.

* * * * *